United States Patent [19]

McCollum et al.

[11] Patent Number: 4,972,581
[45] Date of Patent: Nov. 27, 1990

[54] OPTICAL FIBER ACCESS TOOL

[75] Inventors: Brian E. McCollum, Salem, Va.; Benjamin B. Hill, West Boylston, Mass.

[73] Assignee: Alcatel NA, Inc., Hickory, N.C.

[21] Appl. No.: 81,949

[22] Filed: Aug. 5, 1987

[51] Int. Cl.[5] .............................................. B21F 13/00
[52] U.S. Cl. .................................... 30/90.1; 30/90.4; 81/9.4
[58] Field of Search ...................... 30/90.1, 90.4, 293; 81/9.4

[56] References Cited

U.S. PATENT DOCUMENTS 4,148,142  4/1979  Sullivan et al. ..................... 30/293
4,662,710  5/1987  Benge ................................. 225/103
4,689,882  9/1987  Lorenz ................................ 30/90.1

Primary Examiner—Frank T. Yost
Assistant Examiner—Willmon Fridie, Jr.
Attorney, Agent, or Firm—Peter C. Van Der Sluys

[57] ABSTRACT

A tool is provided for the purpose of allowing access to optical fibers held within a buffer tube. The buffer tube is held in a closed channel formed by the engagement of a clamp against a main body. A blade is inserted from the main body into the buffer tube so as to define a chord across the cross section of the buffer tube. The tool is drawn along the buffer tube so as to remove a portion of its protective covering threby allowing access to the optical fibers held therein.

13 Claims, 3 Drawing Sheets

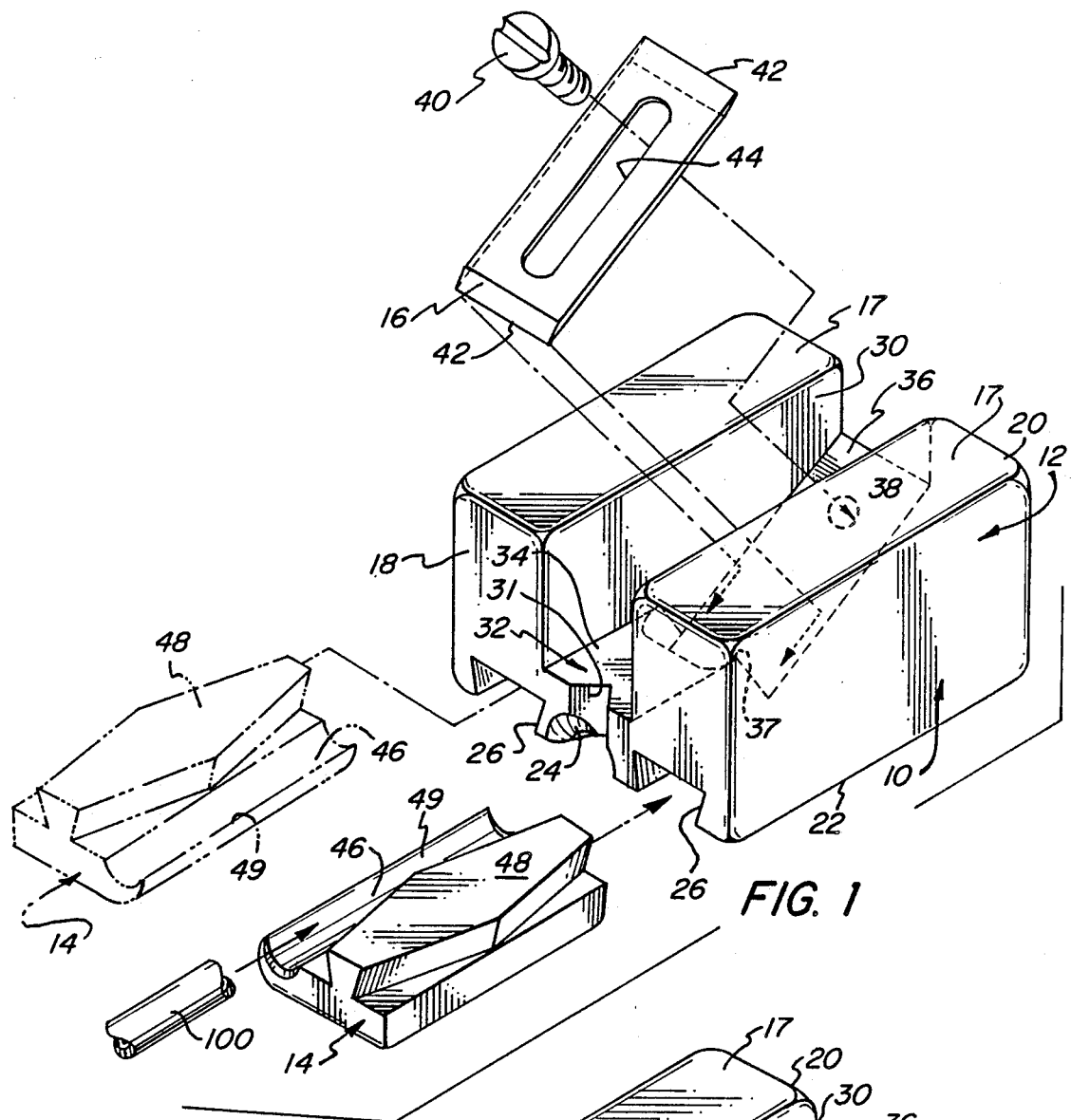
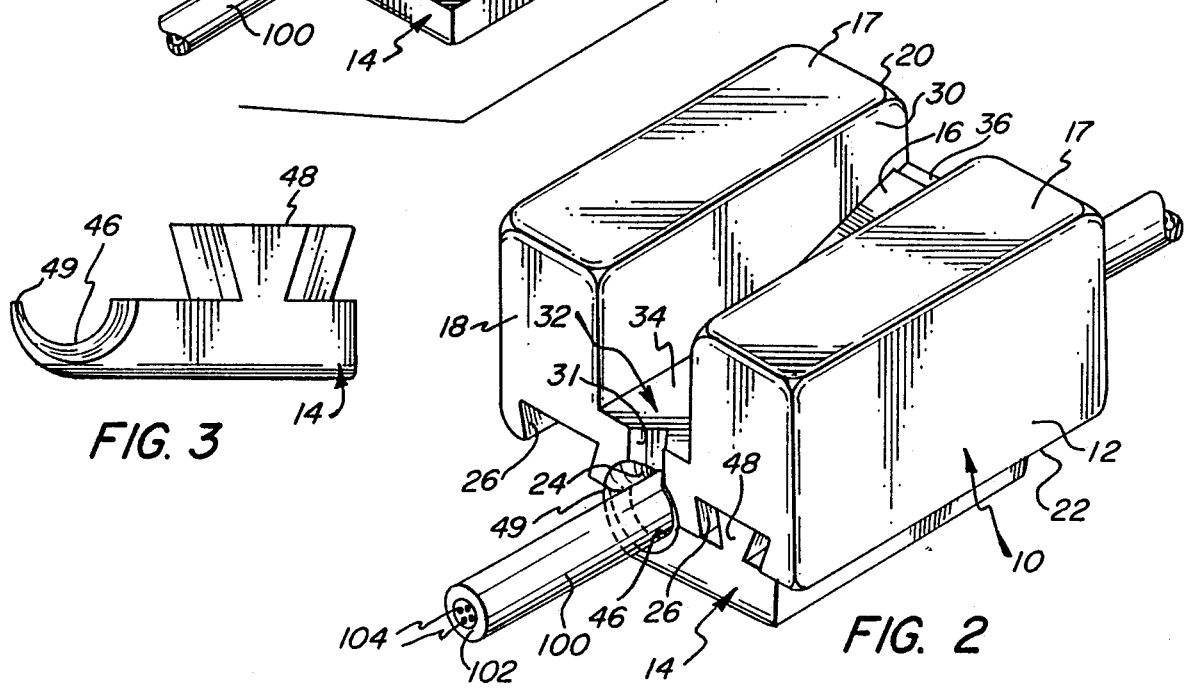

OPTICAL FIBER ACCESS TOOL

BACKGROUND OF THE INVENTION

1. Field of the Invention

This invention relates to apparatus for removing a portion of a buffer tube used in a loose tube type of optical fiber cable in order to selectively access an optical fiber found therein.

2. Description of the Prior Art

The use of optical fibers in telephonic and other communication is well-known in the prior art. In order to protect the delicate optical fibers and to facilitate the laying of optical fibers it is well-known to loosely dispose a number of fibers in a buffer tube.

In a known cable assembly, several buffer tubes are wrapped around a central elongate strength or support member and the resultant structure is encased within a common protective sheath of steel and plastic material such as polyethylene, polyurethane, polyvinylchloride, etc. The interior of the cable, between buffer tubes, is filled with a resin or oil-like substance providing lubrication and water resistance. The interior of the buffer tubes is usually filled with a gel which surrounds the individual optical fibers thereby providing lubrication, water resistance, and a light barrier between optical fibers for preventing interference between the fibers.

A design in which one or more optical fibers are loosely disposed in a buffer tube so as to "float" within the gel enclosed therein may be referred to as a loose buffer tube design. Typical variations of the aforementioned design may be found in U.S. Pat. Nos. 4,072,398; 4,143,942; 4,153,332 and 4,230,395.

While optical fibers have many advantages, such as high density and lack of electromagnetic interference, over traditional conducting cable in the communications field, they have a major disadvantage in that there is degradation in transmission efficiency after a fiber has been spliced or in anyway joined with another fiber after the original manufacture. Such a splice may be inevitable in the event of fiber breakage, the rerouting of a communications line or the insertion of an intermediate device within the communications line. However, such a splice may only be required for a single or limited number of fibers within the cable or buffer tube. Under such circumstances, it would be extremely time consuming and degrading to the communication efficiency to completely sever and subsequently splice all the optical fibers in a cable or buffer tube in order to access a single optical fiber. It would therefore be advantageous to provide a device which could allow access to a limited number of fibers within a fiber optic cable without cutting or otherwise disturbing the remaining optical fibers.

Siecor Corporation manufactures Optical Fiber Access Tool (OFT-000) which consists of two subassemblies hinged to one another. Each subassembly includes two open wedge-shaped channels, disposed parallel to the longitudinal axis of the device. The open channels are positioned so that when the subassemblies are folded against one another, two closed channels of a diamond cross-section are formed therebetween. Each channel is of a different size corresponding to sizes commonly used in the manufacture of buffer tubes.

Each of the open channels includes a blade disposed parallel to its longitudinal axis. The blade is seated so as to extend into the center of the channel.

In order to access an optical fiber, the buffer tube is placed into an open channel of an appropriate size and the subassemblies are folded against one another thereby enclosing the buffer tube. As the buffer tube is enclosed, two blades, one blade from each subassembly, are driven into the buffer tube. The user then draws the tool parallel to the longitudinal axis of the buffer tube thereby cutting the buffer tube in two and exposing the optical fibers. The two halves of the buffer tube are then removed leaving all fibers totally exposed and unprotected.

The Siecor device exhibited several disadvantages. The buffer tube is cut by two blades each extending to the center of the tube resulting in a more intrusive device than is sometimes necessary. Such intrusion may result in unwanted nicking or severing of an optical fiber. Since the tool is very large, the buffer tube must be withdrawn a significant distance from the cable in order to fit the tool around the buffer tube. This presents considerable difficulty when attempting to use the tool with a cable whose buffer tubes are helically wound and are not provided with a large amount of slack. Indeed, the Siecor device is particularly designed for a cable having buffer tubes with a reverse helical lay so that the buffer tubes have significant slack when a length of sheathing is removed.

A loose, improperly seated, or dirty blade could extend even further into the buffer tube thereby causing even more damage to the optical fibers. As the cutting process is hidden from view by the folded subassemblies, the user is not able to monitor the cutting process and stop in the event of malfunction. Finally, the device, in its open position, presents four exposed blades thereby creating a hazard to the user.

SUMMARY OF INVENTION

It is therefore a primary object of this invention to provide an optical fiber access tool which effects minimal intrusion into the buffer tube.

A further object is to provide an optical fiber access tool which may be used on a wide variety of designs of fiber optic cables, particularly, which may be used on a fiber optic cable design wherein the buffer tubes have little slack within the cable thereby requiring the tool to operate with little distance between the buffer tube and the cable.

A further object of this invention is to provide an optical fiber access tool which has a cutting depth which is easily adjusted, is resistant to malfunctions which may cause damage to the optical fibers, performs the cutting action in essentially open view of the user and does not have an exposed blade which may be a hazard to the user.

In accordance with the present invention, a fiber optic access tool is provided which includes three major parts—a body, a clamp and a blade.

The body is roughly cubical in shape and has an open channel adapted to receive a portion of the cross section of the buffer tube workpiece. The clamp is designed to be slidably received onto the body thereby closing the channel and engaging the buffer tube between the body and the clamp. The body is constructed symmetrically to allow the clamp to be received for either right- or left-handed operation. The clamp presents an edged surface in order to allow the clamp to be inserted between a buffer tube and a cable when only a little slack is present.

The blade of the tool is adjustably attached to the body so that the edge extends into the channel. The edge of the blade is perpendicular to the axis of the channel and defines a chord across its circular cross-section. The blade can remove a section of the buffer tube as the tool is moved along the tube, thereby allowing access to the optical fibers found therein. The blade is not in an intrusive position so as to risk nicking or severing an optical fiber. The body of the blade is placed at an acute angle with the buffer tube, so that a loose blade would rise away from the buffer tube during the cutting process thereby effecting too little cutting instead of too much. The blade is in plain view of the user so that the cutting process may be monitored, allowing the user to stop in the event of an observed malfunction or misadjustment. Finally, while the blade remains in plain view, the user is protected from contact with the blade edge which is surrounded by a slot in the body. The blade is easily removed for cleaning or replacement.

DESCRIPTION OF THE DRAWINGS

Further objects and advantages of the invention will become apparent from the following description and claims, and from the accompanying drawings, wherein:

FIG. 1 is an exploded perspective view of the present invention.

FIG. 2 is an assembly drawing of the present invention shown in perspective.

FIG. 3 is a front view of the clamp.

DETAILED DESCRIPTION OF THE PREFERRED EMBODIMENT

Figure 4:
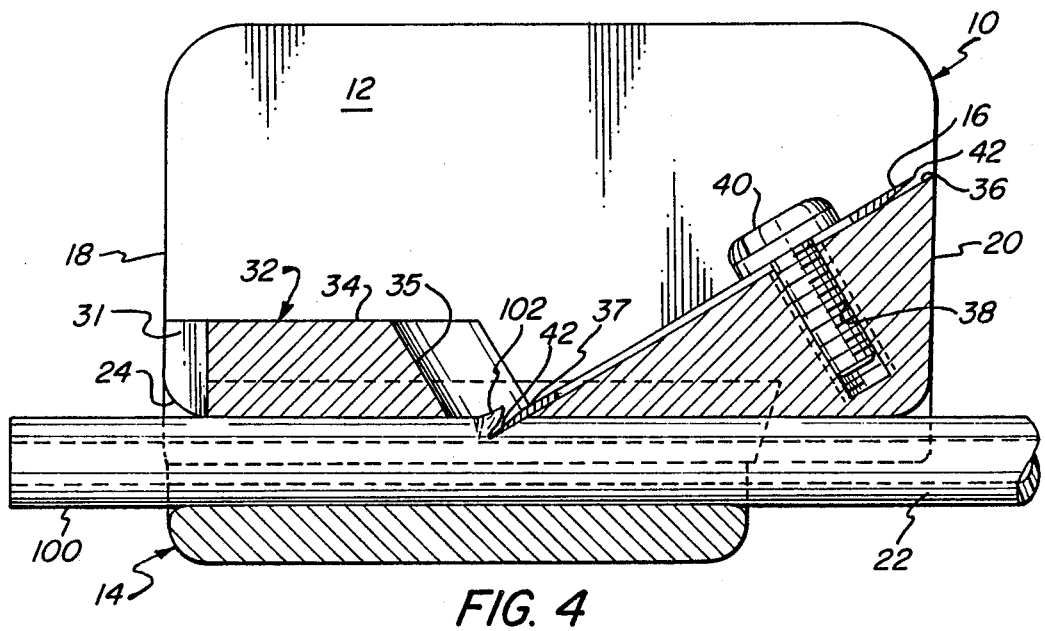
FIG. 4 is a cross-section taken along line 4—4 of FIG. 5.

Referring now to the drawings wherein like numerals indicate like elements throughout the several views, the apparatus 10 of the present invention includes a main body 12, a clamp 14, and blade 16.

The main body 12 includes an upper surface 17, a front surface 18, a rear surface 20 and a lower surface 22.

The lower surface 22 of the main body 12 includes an open channel 24 having a semi-circular cross-section with a diameter approximately equal to that of a buffer tube 100 to be cut. Channel 24 extends for the length of the main body 12. On both sides of, and parallel to, channel 24 are female dovetail slots 26 having a cross-sectional shape of an inverted truncated triangle. Slots 26 have a front portion 27 of constant width extending from the front surface 18 into the main body 12 to a position slightly less than halfway to the rear surface 20. A rear portion 29 has a width that narrows until the portion terminates at a surface 28.

The front surface 18 of the main body 12 includes an indentation 31 located above the channel 24 for a purpose that will be made clear hereinafter.

The upper surface 17 of the main body 12 includes a slot 30 which is parallel to and overlies channel 24. A bottom 32 of the slot 30 is formed of three sections. A front section 34 extends horizontally or at a right angle away from the front surface 18. A rear section 36 inclines downwardly from the rear surface 20, to a position below the level of the front section 34 and intersects channel 24. A center section 35 connects surfaces 34 and 36 and also intersects channel 24, and at least its central portion is perpendicular to surface 36. The intersections of surfaces 35 and 36 with channel 24 form an opening 37 between the upper slot 30 and channel 24. Surface 36 includes a threaded aperture 38 into which a screw 40 may be threadably received.

The blade 16 is of generally rectangular shape with the narrow sides forming cutting edges 42. A slot 44 is found longitudinally in the blade. The blade 16 is fastened to the main body 12 by inserting screw 40 into slot 44 and into threaded aperture 38. The edge 42 of blade 16 extends into opening 37 and defines a horizontal chord across the semi-circular cross-section of channel 24.

Clamp 14 includes a semi-circular channel 46 dimensionally sized to accept the buffer tube 100 and having a radius slightly larger than that of the buffer tube 100. Clamp 14 further includes an upwardly extending male dovetail ridge 48 having a cross-sectional shape of an inverted truncated triangle. The width of the ridge narrows in both directions from its mid point so that each half of the ridge is complimentary to the rear portion 29 of slots 26. Thus, ridge 48 may be slidably received into either of the slots 26 of the main body 12 whereby the channel 24 and channel 46 form a closed cylindrical channel slightly larger than the buffer tube 100. A tapered edge 49 of clamp 14 defines one side of channel 46 disposed opposite ridge 48.

Figure 8:
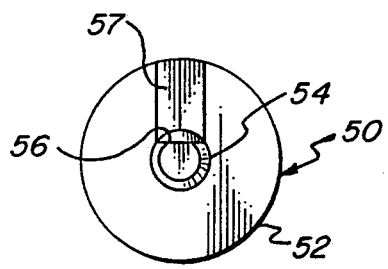
FIG. 8 is a front view of the gauge of FIG. 7.
Figure 7:
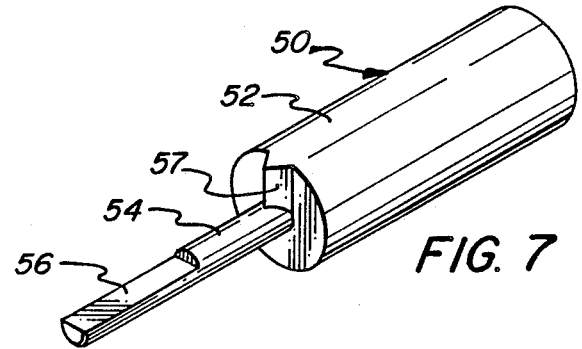
FIG. 7 is a view in perspective of a gauge for use with the present invention.

An accessory for use with apparatus 10 is a gauge 50 shown in FIGS. 7 and 8. Gauge 50 includes a handle 52 from which cylinder 54 extends. Cylinder 54 has a diameter substantially equal to a standard sized buffer tube and is dimensioned to be slidably received in the closed channel defined by channel 24 and channel 46. Notch 56 is cut from the cylinder 54 and defines a chord in the circular cross-section of the cylinder. The depth of the notch corresponds to an appropriate depth to which blade 16 should be inserted into the buffer tube.

Figure 9:
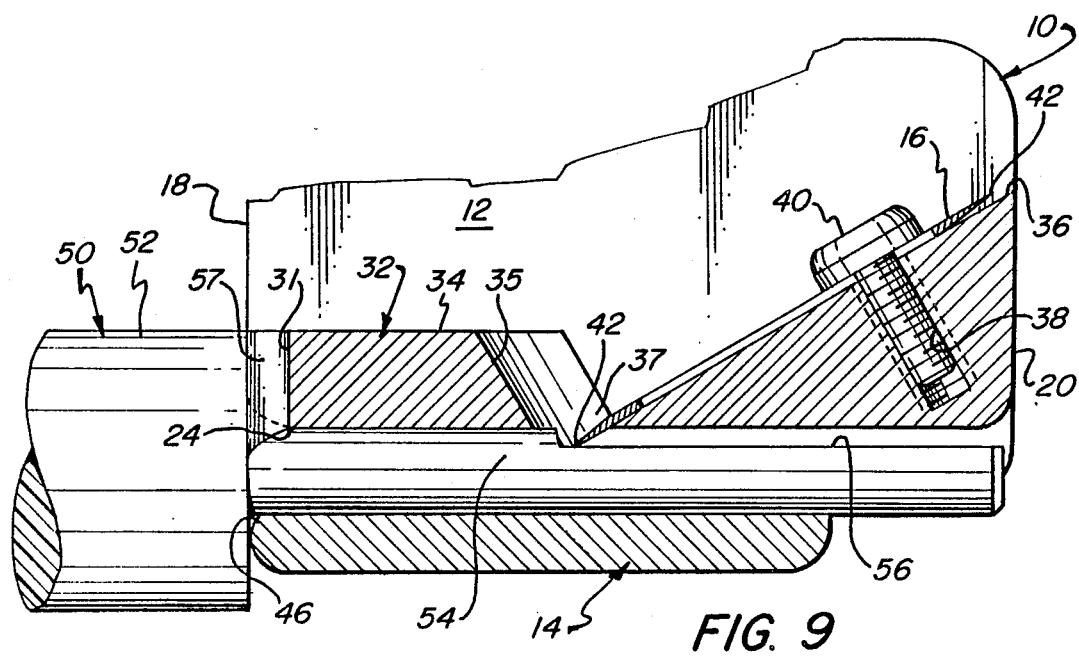
FIG. 9 is a cross-section of the present invention with its accessory gauge inserted in position for undertaking the depth of cut setting procedure.

The gauge 50 is used to set the depth of cut for the blade 16 to permit the apparatus 10 to cut through the buffer tube 100 without cutting the optical fibers contained therewithin. The following depth of cut setting procedure should be undertaken when (1) a new blade is being positioned for use in the apparatus 10 or (2) an existing blade in the apparatus 10 is in need of adjustment or has been removed for cleaning etc. Referring to FIG. 9, the gauge 50 is shown inserted into the closed channel formed by the channels 24 and 46. The pointed projection 57 of the gauge 50 is positioned within the indentation 31 in the front surface 18 of the apparatus 10. Thereinafter, the blade 16 is positioned along the rear section 36 of bottom 32 of the slot 30 so that the blade 16 abuts the flat surface of notch 56 on gauge 50 and thereby extends an appropriate depth into channel 24. Screw 40 is then tightened so as to secure blade 16 to main body 12 and the apparatus 10 is ready for use after the gauge 50 is slidably removed therefrom.

Figure 5:
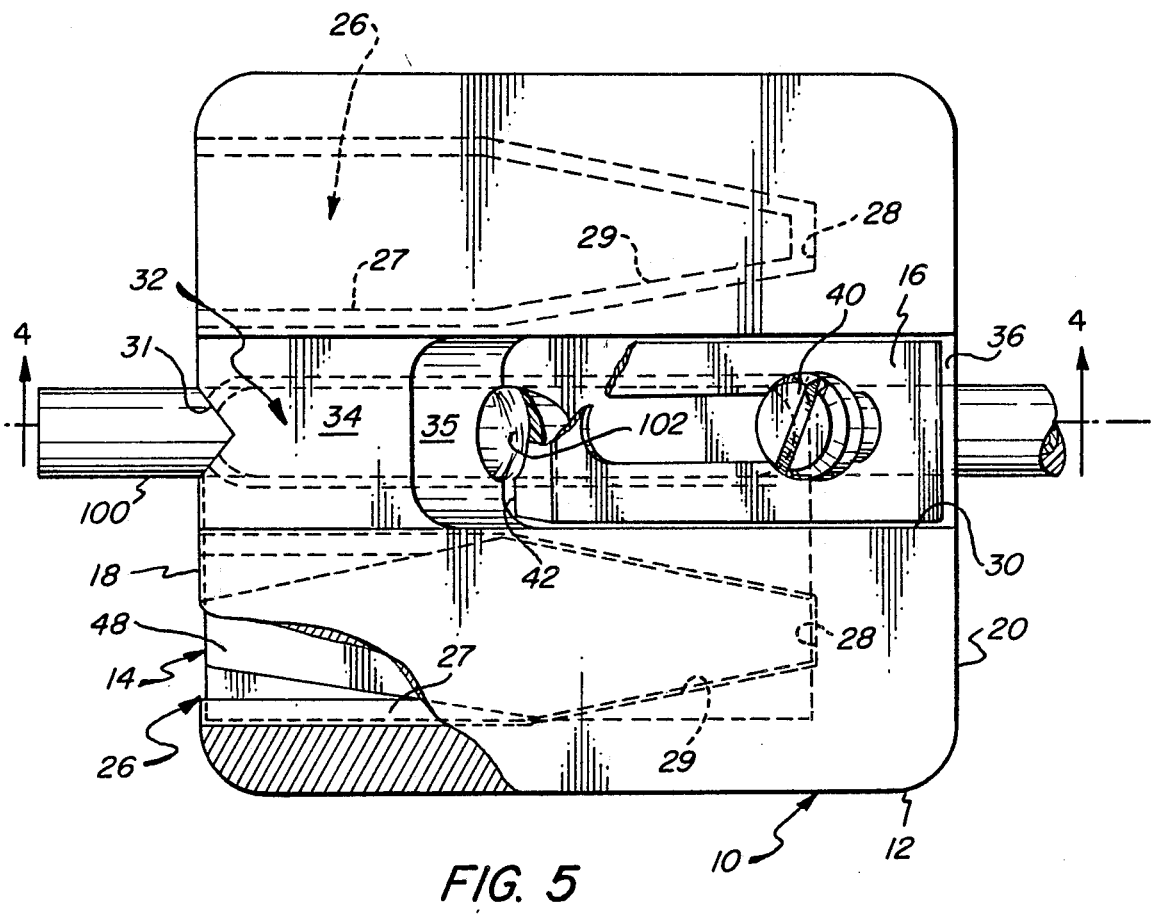
FIG. 5 is a top view with portions of the body and blade being cutaway.
Figure 6:
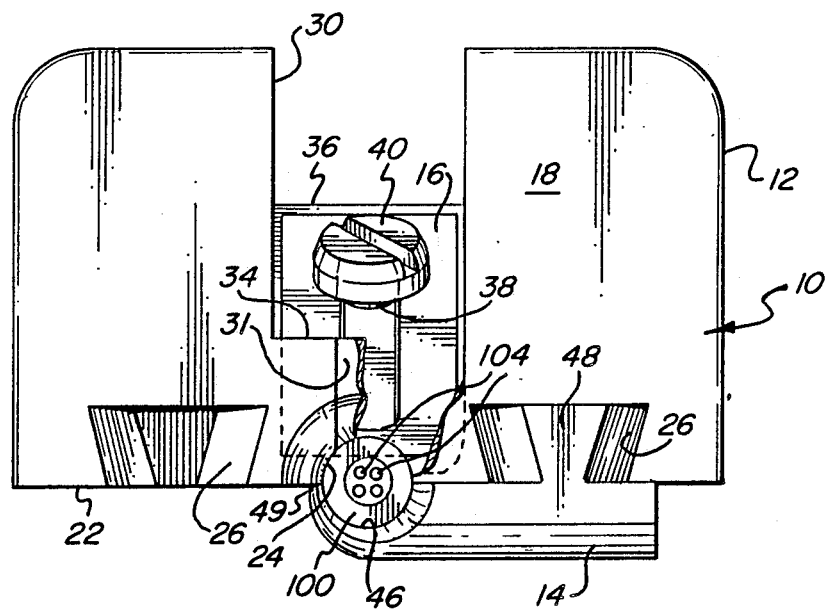
FIG. 6 is a front view with a portion of the body being cutaway.

Once the depth of cut is properly set, in order to use the apparatus 10, one opens the protective sheath of the cable (not shown) to expose the buffer tube 100. Using gauge 50, the size of buffer tube 100 and the size of cylinder 54 should be compared to insure the apparatus 10 is the correct size for the buffer tube 100. After this is confirmed, the edge 49 of clamp 14 is inserted between buffer tube 100 to be cut and the adjacent buffer tubes (not shown) and the central elongated strength or support member (not shown). The clamp 14 is then rotated so that the channel 46 cradles the buffer tube 100 and also exposes the male dovetail ridge 48. The body 12 is then slidably introduced to the clamp 14 so that one of the female dovetail slots 26 surrounds the male dovetail ridge 48 of clamp 14. Either female dovetail slot 26 can be chosen to slidably receive the male dovetail ridge depending upon the desired direction of the cutting action. In this case, the right hand slot 26 as viewed in FIG. 6 has been utilized. As the clamp 14 and the body 12 are slid relative to one another, they surround the buffer tube 100 forcing it against blade 16 to make a cut which removes a portion 102 of buffer tube 100. (See FIGS. 4 and 5). The apparatus 10 is then drawn along the buffer tube 100 in the proper direction so that the blade 16 cuts a desired portion of the buffer tube 100 thereby allowing selective access to the optical fibers 104 contained therein.

Following the cutting of the buffer tube 100, the body 12 is then slidably removed from clamp 14 by appropriate relative manipulation of the body 12 and clamp 14 to slide the male dovetail ridge 48 from the female dovetail slot 26. The body 12 is drawn away from the buffer tube 100 allowing the cut portion to exit the body 12 through opening 37. The cut portion is then carefully cut away from buffer tube 100 and clamp 14 is rotated once again to disengage it from the buffer tube 100.

It should be understood that the main body of the apparatus can be of various sizes, shapes and designs. Furthermore, it is contemplated that the present invention could incorporate only one female dovetailed slot instead of two as shown in the preferred embodiment.

In order to accomodate various standard size buffer tubes, a set of access tools, including a plurality of apparatus and corresponding gauges, would be provided to the user. Each of the individual tools would correspond in size to a different standard size buffer tube and would be marked or labelled appropriately to facilitate use thereof. For economy purposes, the gauges can be provided with two differently sized cylinders extending outwardly from opposite ends of a single centrally located handle.

It will therefore be seen from the above that my invention provides an optical fiber access tool which allows easy access to optical fibers located within a buffer tube.

While the preferred embodiment admirably achieves the objects of the invention, it will be appreciated that departures can be made by those skilled in the art without departing from the spirit and scope of the invention which is limited only by the following claims.

What is claimed is:

1. A tool for accessing optical fibers within a buffer tube, including:
    a body;
    means cooperating with said body, for forming a channel adapted to receive said buffer tube, said means for forming a channel slidably engages said body, said body includes at least one female dovetail groove extending at least partially into said body parallel to said channel and said means for forming a channel includes a male dovetail ridge adapted to be slidably inserted into said female dovetail groove;
    a blade having a cutting edge; and
    means for mounting said blade so that the cutting edge is offset from the axis of the channel and extends across the channel, whereby the blade is inserted into a buffer tube that is disposed in said channel and movement of the tool along the buffer tube will remove a portion of the buffer tube.

2. The tool of claim 1, wherein said female dovetail groove extends partially into said body with a constant cross-section and then narrows in width.

3. The tool of claim 1, wherein said body includes two female dovetail grooves, one on each side of said channel.

4. The tool of claim 3, wherein said female dovetail grooves extend partially into said body with a constant cross-section and then narrows in width.

5. The tool of claim 4, wherein said male dovetail ridge narrows in width in both longitudinal directions from its center so that said male dovetail ridge may be slidably inserted into either female dovetail groove.

6. A tool for accessing optical fibers within a buffer tube, including:
    a body, including an outwardly opening groove adapted to receive said buffer tube;
    means co-operating with said body, for forming a channel adapted to receive said buffer tube, said means including a clamp member having a groove formed along one edge thereof and means for slidably engaging said body;
    a blade having a cutting edge; and
    means for mounting said blade so that the cutting edge is offset from the axis of the channel and extends across the channel, whereby the blade is inserted into a buffer tube that is disposed in said channel and movement of the tool along the buffer tube will remove a portion of the buffer tube.

7. The tool of claim 6, wherein said blade mounting means including means for adjusting the position of said blade so that the depth of the cutting edge into the channel may be selected.

8. The tool of claim 7, wherein said adjusting means includes:
    a sloping surface of said body disposed at an acute angle with the channel axis, said blade being slidably positioned on said surface; and
    means for securing said blade to said sloping surface.

9. The tool of claim 7, further including means for gauging the depth of said blade into said channel.

10. The tool of claim 8, wherein said securing means includes a threaded aperture in said sloping surface, a slot in said blade and a screw inserted through said slot and threadably received into said threaded aperture.

11. A tool for accessing optical fibers within a buffer tube, including:
    a body;
    means slidably engaging said body and attachable thereto by means of a dovetail connection for cooperating with said body to form a channel adapted to receive said buffer tube;
    a blade having a cutting edge; and
    means for mounting said blade so that the cutting edge is offset form the axis of the channel and extends across the channel, whereby the blade is inserted into a buffer that is disposed in said channel and movement of the tool along the buffer tube will remove a portion of the buffer tube.

12. The tool of claim 10, wherein said slot of said blade is perpendicular to said cutting edge of said blade.

13. The tool of claim 9, wherein said gauging means is a cylinder having a diameter substantially equal to that of the buffer tube and having a cord removed corresponding to a desired depth of insertion of said cutting edge into the buffer tube.

* * * * *